(12) United States Patent
    Jochman

(10) Patent No.: US 10,150,364 B2
(45) Date of Patent: Dec. 11, 2018

(54) FLUID CONTAINERS TO EVACUATE SPILLED FLUID FROM THE INTERIOR OF AN ENCLOSURE OF THE FLUID CONTAINER

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 264 days.

(21) Appl. No.: 15/140,692

(22) Filed: Apr. 28, 2016

(65) Prior Publication Data
    US 2017/0313175 A1    Nov. 2, 2017

(51) Int. Cl.
    *B60K 15/03*    (2006.01)
    *B60K 15/04*    (2006.01)
    *F02B 63/04*    (2006.01)

(52) U.S. Cl.
    CPC ........ *B60K 15/03* (2013.01); *B60K 15/03177* (2013.01); *B60K 15/04* (2013.01); *B60K 2015/03381* (2013.01); *B60K 2015/0477* (2013.01); *B60K 2015/0496* (2013.01); *F02B 63/044* (2013.01)

(58) Field of Classification Search
    CPC .. B60K 15/03; B60K 15/03177; B60K 15/04; B60K 2015/03381; B60K 2015/0477; B60K 2015/0496; F02B 63/044
    See application file for complete search history.

(56) References Cited

U.S. PATENT DOCUMENTS

| 4,013,105 | A  | * | 3/1977 | Uuskallio | B60K 15/04 123/198 E |
| 5,785,099 | A  | * | 7/1998 | Kashani | B60K 15/04 141/392 |
| 6,279,781 | B1 | * | 8/2001 | Konar | B67D 1/16 137/312 |
| 7,216,778 | B2 | * | 5/2007 | Kaeb | B67D 1/16 137/312 |
| 8,800,609 | B1 | * | 8/2014 | Krechowiecki | B60K 15/04 141/338 |
| 2004/0168654 | A1 | * | 9/2004 | Radtke | B60K 15/063 123/2 |
| 2015/0267652 | A1 | | 9/2015 | Jochman | |

FOREIGN PATENT DOCUMENTS

EP    2962925    1/2016
JP    02188621   7/1990

OTHER PUBLICATIONS

Extended European Search Report for Appln. No. 17155664.0 dated Jul. 5, 2017 (7 pages).

* cited by examiner

*Primary Examiner* — Francis C Gray
(74) *Attorney, Agent, or Firm* — McAndrews, Held & Malloy, Ltd.

(57) ABSTRACT

Fluid containers to evacuate spilled fluid from the interior of an enclosure of the fluid container are disclosed. An example system includes an enclosure and a fluid container within the enclosure. The fluid container includes a fluid capture area at a top of the fluid container and a channel at a side of the fluid container. The fluid capture area directs the fluid to the channel, and the channel directs the fluid from an interior of the enclosure to an exterior of the enclosure.

20 Claims, 5 Drawing Sheets

FLUID CONTAINERS TO EVACUATE SPILLED FLUID FROM THE INTERIOR OF AN ENCLOSURE OF THE FLUID CONTAINER

SUMMARY

Fluid containers to evacuate spilled fluid from the interior of an enclosure of the fluid container, substantially as illustrated by and described in connection with at least one of the figures, as set forth more completely in the claims.

DETAILED DESCRIPTION

Figure 1:
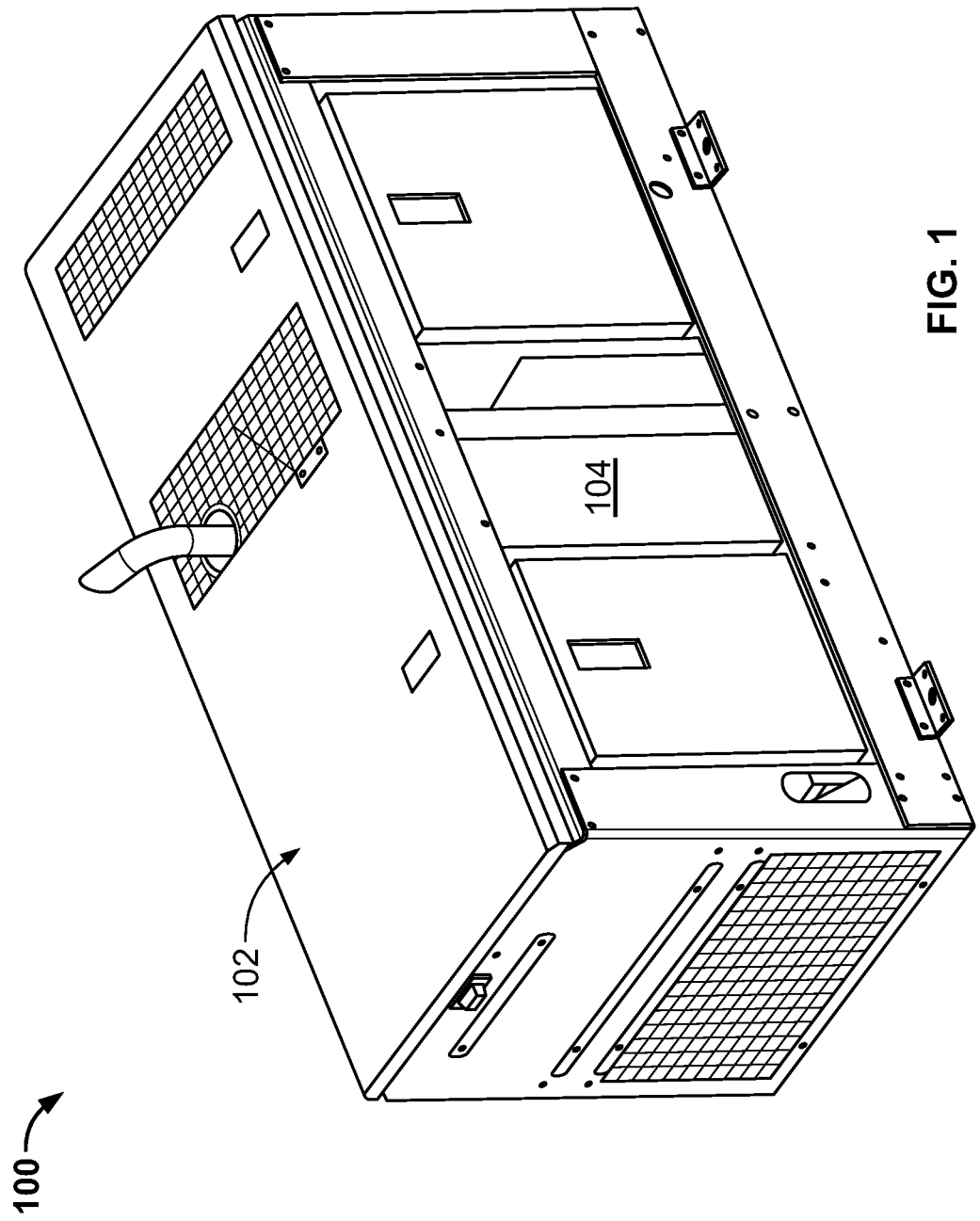
FIG. 1 illustrates an example enclosure containing a liquid container and other interior components, in accordance with aspects of this disclosure.

This invention relates to fluid spill containment of fluid containers that are contained within an outer enclosure. Disclosed examples are described with reference to fuel tanks (e.g., gasoline tanks, diesel fuel tanks, etc.) mounted within sheet metal enclosures containing, among other things, an engine, a generator, and/or electronic components. However, disclosed examples may be adapted for any type of container, any type of fluid, and/or any type of enclosure.

Conventional fuel fill caps and fill necks are external to a product enclosure and implement fuel spill control techniques that generally cause the fuel to stay external to an outer enclosure. Such conventional techniques are designed to keep fuel from entering the enclosure.

Fuel tanks that are largely or completely inside of an enclosure conventionally have fill locations that extend to the outside of an enclosure. The fill neck typically protrudes through the top or side of the enclosure and a sealing mechanism prevents fuel spillage from entering the enclosure. However, if the fuel fill location cannot be extended to the outside of the enclosure and the fuel fill location is accessed by opening a door of the enclosure, then fuel spilled during filling ends up inside the product enclosure.

Disclosed examples evacuate spilled fuel from the enclosure, so that spilled fuel does not pose any risk (e.g., a risk of ignition or explosion). In some examples, the fuel container has a fill location on top of the fuel tank and evacuates liquid fuel spilled inside of the enclosure adjacent the fill location to a location outside of the enclosure. In some examples, the fuel tank fill neck is inside of a sheet metal enclosure. In some other examples, the fuel tank fill neck extends to an outside of the enclosure but does not include a seal. Without the seal, spilled fuel is permitted to penetrate the enclosure near the fill location but is subsequently evacuated from the enclosure.

Disclosed examples include a recessed capture feature integrated into the top of a fuel tank around the fill neck. The recessed capture feature captures spilled fuel and prevents the spilled fuel from reaching other portions of the interior of the enclosure. The recessed capture feature is slanted to direct the liquid to the edge of the top of the fuel tank. The fuel is directed to a channel at the side of the tank. The channel permits the fuel to flow down the side of the tank, where the fuel runs off of the tank and onto a side panel of the enclosure, where the fuel exits the enclosure. The fuel tank laps the sheet metal side panel via an undercut in the fuel tank and an angled flange on the side panel. The tank undercut and the side panel lap direct fuel from the inside of the enclosure to the outside of the enclosure.

As used herein, a container or tank being "within an enclosure" refers to portions of the container or tank being within the enclosure such that fluid spilled at a fluid inlet of the tank (e.g., while filling the tank with the fluid) would fall and/or flow to a location within the interior of the enclosure. For example, portions of the container or tank may be exposed to an exterior of the enclosure or outside of the enclosure (e.g., a channel of the container or tank, the inlet of the container or tank) while the container or tank is considered to be within the enclosure.

Disclosed example systems include an enclosure and a fluid container within the enclosure. In the disclosed example systems, the fluid container includes a fluid capture area at a top of the fluid container and a channel at a side of the fluid container, where the fluid capture area directs the fluid to the channel and the channel directs the fluid from an interior of the enclosure to an exterior of the enclosure.

In some examples, the fluid container is molded to include at least one of the fluid capture area or the channel. In some examples, the fluid container includes a fluid inlet at the top of the fluid container, where the fluid capture area is adjacent and below the fluid inlet. In some such examples, the fluid capture area surrounds the fluid inlet to capture the fluid in any direction with respect to the fluid inlet.

In some example systems, the enclosure includes a door or removable panel to provide access to the fluid inlet. In some such examples, a fluid inlet of the fluid container is not accessible from an exterior of the enclosure when the door or the removable panel are in a closed position. In some example systems, the enclosure includes a flange to direct the fluid from the channel to the exterior of the enclosure. In some such examples, the channel laps the flange. In some examples, the fluid capture area is pitched toward the channel to direct the fluid to the channel. In some examples, the enclosure includes a side panel, where the fluid container is mounted in the enclosure adjacent the side panel, and the flange is integral with the side panel.

Disclosed power systems include an enclosure, an engine installed within the enclosure, and a fuel tank installed within the enclosure to store fuel for the engine. In the example power systems, the fuel tank includes a fuel capture area at a top of the fuel tank, and a channel at a side of the fuel tank, where the fuel capture area directs the spilled fuel to the channel and the channel directs the spilled fuel from an interior of the enclosure to an exterior of the enclosure.

In some examples, the fuel tank is molded to include at least one of the fuel capture area or the channel. In some example systems, the fuel tank includes a fuel inlet at the top of the fuel tank, the fuel capture area being adjacent and below the fuel inlet. In some such examples, the fuel capture area surrounds the fuel inlet to capture the spilled fuel in any direction with respect to the fuel inlet. In some examples, the enclosure includes a door or removable panel to provide access to the fuel inlet. In some such examples, a fuel inlet of the fuel tank is not accessible from an exterior of the enclosure when the door or the removable panel are in a closed position.

In some example systems, the enclosure includes a flange to direct the fluid from the channel to the exterior of the enclosure. In some such examples, the channel laps the flange. In some examples, the fuel capture area is pitched toward the channel to direct the fuel to the channel. In some examples, the enclosure includes a side panel, where the fuel tank is mounted in the enclosure adjacent the side panel, and the flange is integral with the side panel.

FIG. 1 illustrates an example enclosure 100 containing a liquid container (e.g., a fuel tank) and other interior components. The example enclosure 100 of FIG. 1 is for a power system that provides electrical, hydraulic, and/or pneumatic power for any of a variety of activities. The example enclosure 100 is made of sheet metal panels.

The enclosure 100 protects interior components from environmental conditions. Such interior components may include an engine, a generator, a fuel tank for the engine, electronic components, hydraulic components, pneumatic components, and/or the like. The fuel tank is not accessible from the exterior of the enclosure 100. The enclosure 100 includes an access door 102 that can be opened to provide access to the fuel tank, for example, to enable refilling of the fuel tank.

As described in more detail below, the example enclosure 100 also includes multiple side panels. The side panel designated 104 includes an angled flange, which is shown in more detail in FIGS. 4 and 5, to enable evacuation of spilled fuel from the interior of the enclosure 100.

Figure 2:
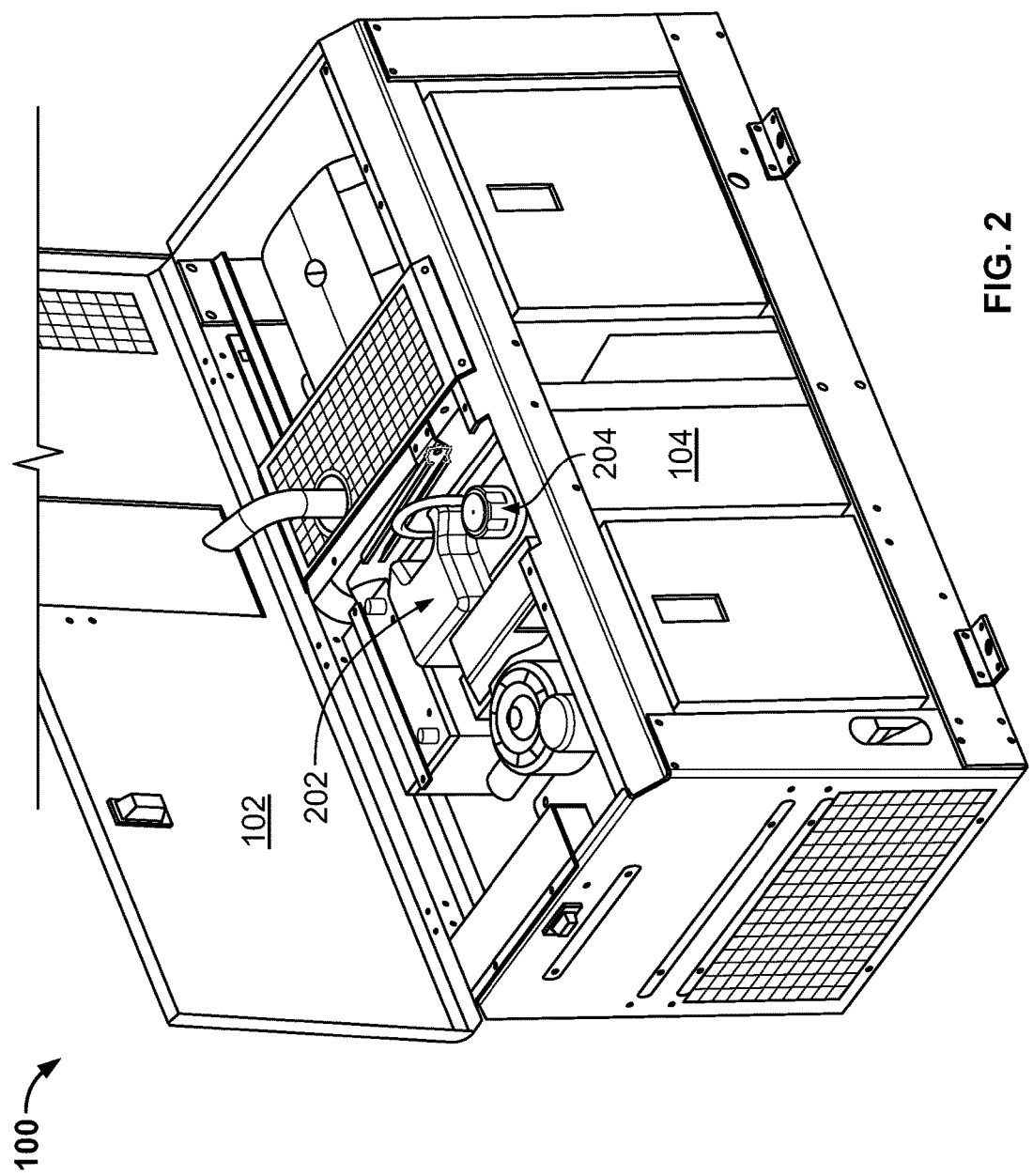
FIG. 2 illustrates the example enclosure of FIG. 1 shown with its access door opened to provide access to an example fuel tank in the interior of the enclosure, in accordance with aspects of this disclosure.

FIG. 2 illustrates the example enclosure 100 of FIG. 1 shown with its access door 102 opened to provide access to an example fuel tank 202 in the interior of the enclosure 100. The fuel tank 202 has a fill location 204 at a top of the fuel tank 202 (e.g., in a typical or intended orientation of the fuel tank 202). In the example of FIG. 2, the fill location 204 is within an interior of the enclosure 100 and is accessible by opening the door 102. In some other examples, the fill location 204 within the interior of the enclosure 100 and is accessible through a hole in the enclosure 100 above the fill location 204. In still other examples, the fill location 204 extends from the fuel tank 202, which is on the interior of the enclosure 100, to the exterior of the enclosure 100 through a hole in the door 102. In such examples, the hole may not be sealed, enabling the door 102 to be opened. Fuel spilled while filling the fuel tank 202 may flow and/or fall into the hole in the door 102, but is still captured as described in more detail below.

Figure 3:
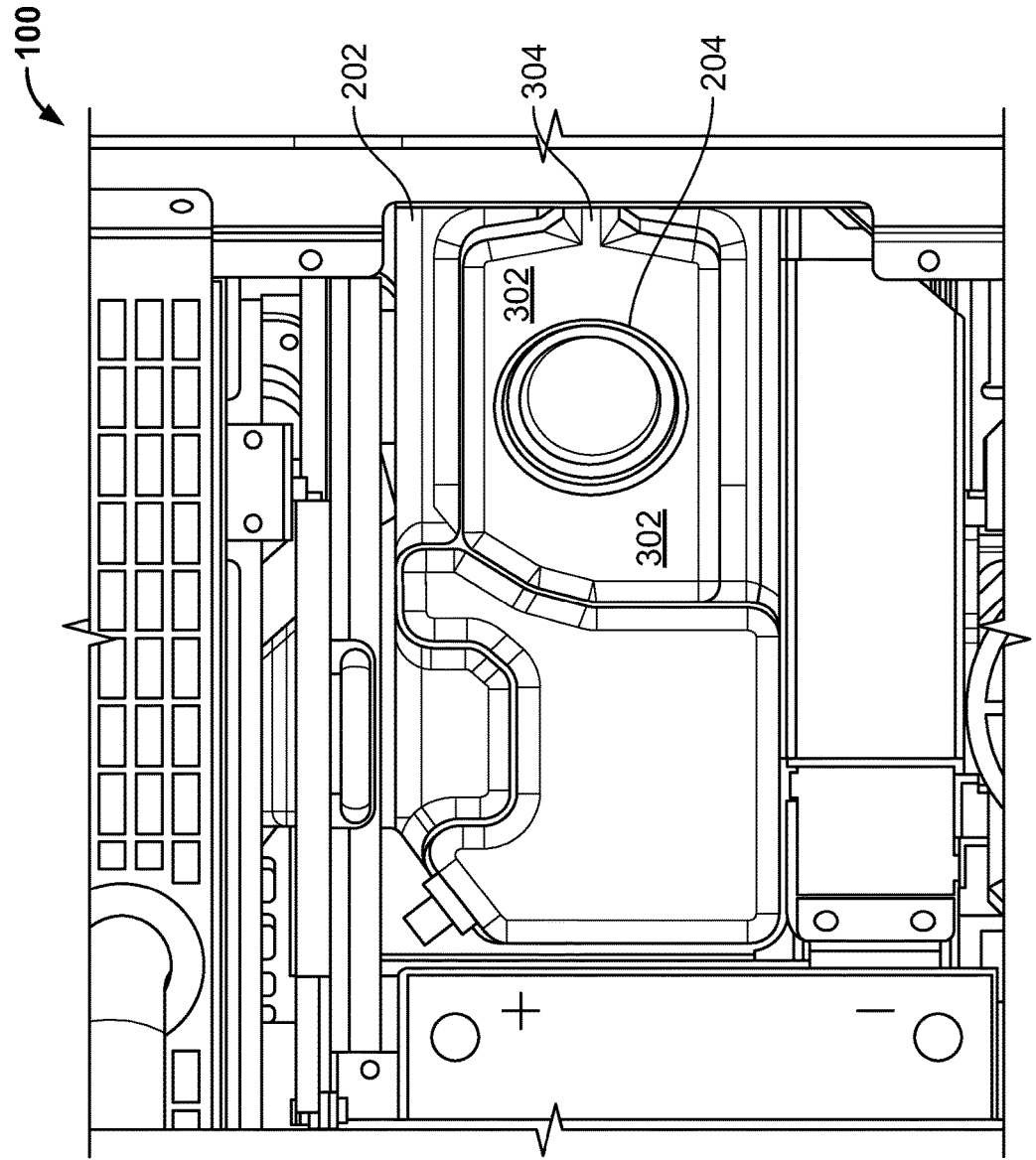
FIG. 3 illustrates an overhead view of the fuel tank of FIG. 2 in the enclosure of FIGS. 1 and 2.

FIG. 3 illustrates an overhead view of the fuel tank 202 of FIG. 2 in the enclosure 100 of FIGS. 1 and 2. As shown in FIG. 3, the fuel tank 202 includes a recessed fuel capture area 302 that collects fuel spilled from the fill location 204 and/or adjacent the fill location 204. The fuel capture area 302 is molded into the fuel tank 202. In the example of FIG. 3, the fuel capture area 302 is molded into the fuel tank 202. However, the fuel capture area 302 may be implemented using a fuel capture tray or other configuration that is attachable or can otherwise be placed on the top of the fuel tank 202 to capture spilled fuel.

As shown in FIG. 3, the fuel tank 202 is adjacent a side of the enclosure 100. The fuel tank 202 further includes a channel 304 that directs fuel from the capture area 302 to an exterior of the enclosure 100 at the side of the fuel tank 202 near the side of the enclosure 100. The example channel 304 is molded as part of the example fuel tank 202. In other examples, the channel 304 is separate from the fuel tank 202 and may be attached to the fuel tank 202 or otherwise placed in fluid communication with the fuel capture area 302.

Figure 4:
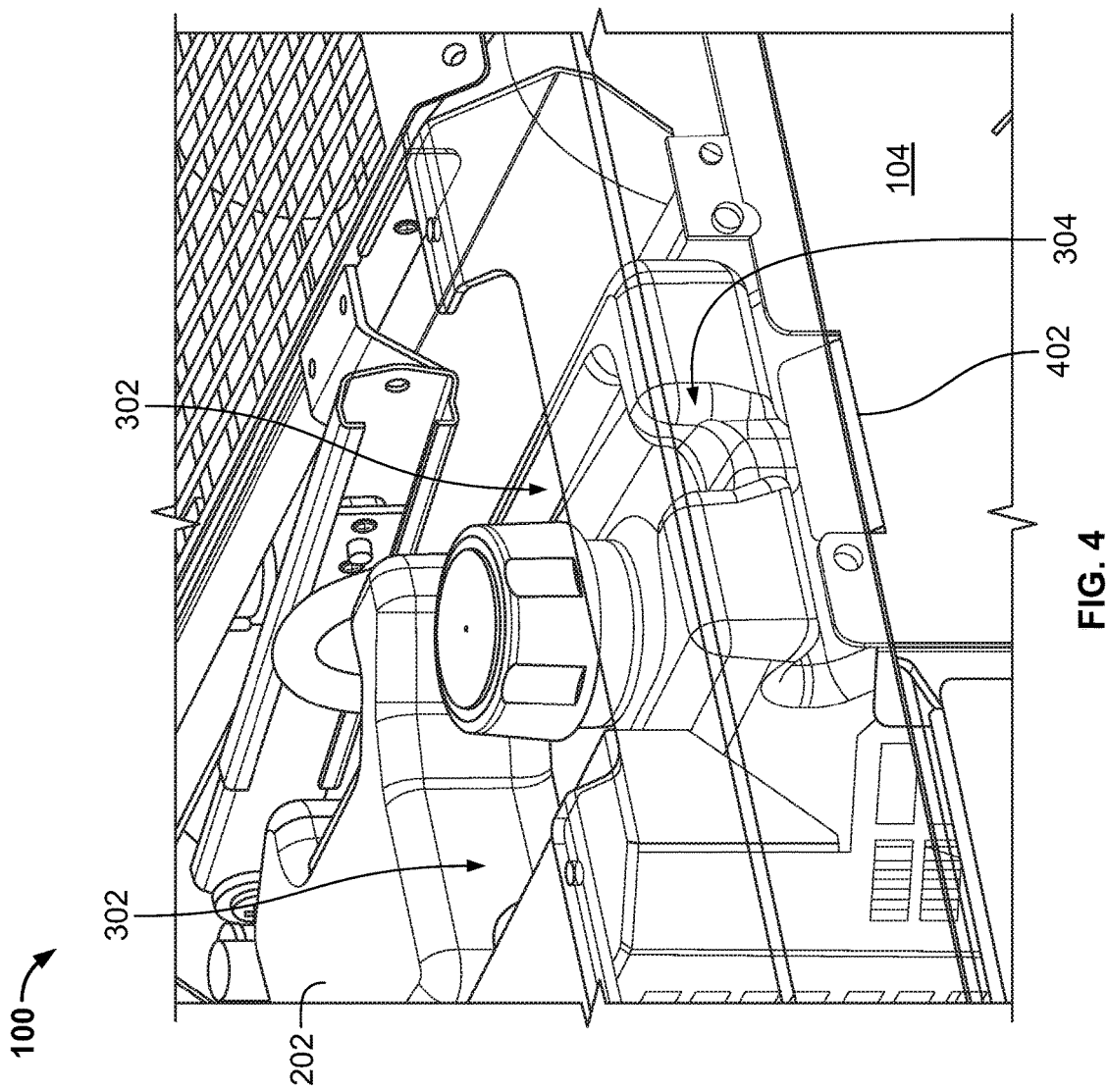
FIG. 4 is another view of the fuel tank of FIG. 2 and an angled flange in the side panel of the enclosure configured to direct spilled fuel out from the interior of the enclosure.

FIG. 4 is another view of the fuel tank 202 of FIG. 2 and an angled flange 402 in the side panel 104 of the enclosure 100 configured to direct spilled fuel out from the interior of the enclosure 100. Fuel flowing from the fuel capture area 302 to the channel 304 falls onto the flange 402 and flows out to the exterior of the enclosure 100.

Figure 5:
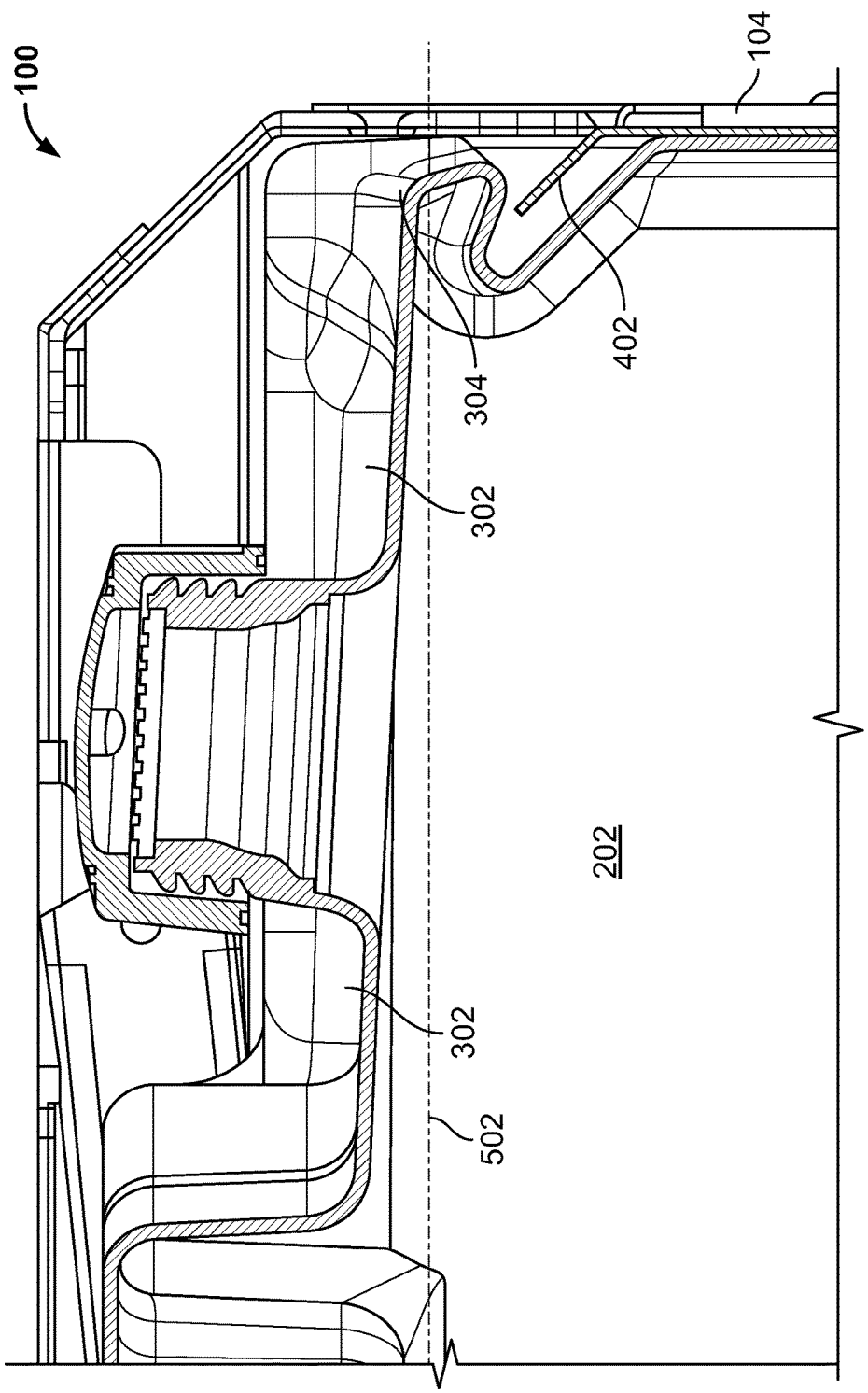
FIG. 5 is a side view of the example fuel tank of FIGS. 2-4 and the angled flange of FIG. 4.

FIG. 5 is a side view of the example fuel tank 202 of FIGS. 2-4 and the angled flange 402 of FIG. 4. As shown in FIG. 5, the capture area 302 is tilted toward the channel 304 to cause spilled fuel to flow toward the channel 304 and the flange 402. The tilt is illustrated with reference to a horizontal reference 502 (e.g., when the enclosure 100 is substantially level).

In the example of FIGS. 4 and 5, the channel 304 laps the flange 402. In other examples, the channel 304 and/or the flange 402 have alternative geometries, such as having the channel 304 terminate at the flange such that the flange 402 is a continuation of the structure of the channel 304. Any other geometries and/or physical relationships that cause the channel 304 and the flange 402 to direct the fuel from the fluid capture area 302 to the exterior of the enclosure 100 may be used.

While an example geometry of the channel 304 is illustrated in FIGS. 3, 4, and 5, other geometries may be used to direct fluid from fuel capture area 302 to an exterior of the enclosure 100. For example, the channel 304 may extend directly to the exterior of the enclosure, or close enough to the exterior of the enclosure 100 to enable the momentum of the fuel flowing from the fuel capture area 302 through the channel 304 to eject the fuel from the enclosure 100 (e.g., via a hole in the enclosure). The channel 304 may include any appropriate geometries to direct the fuel from the fuel capture area 302 to the exterior of the enclosure 100 and/or to an intermediate structure (e.g., the flange 402) that directs the fuel outside of the enclosure 100.

Disclosed examples enable fluid container fill locations to be located within the interior of an enclosure, which can improve protection of the fluid container and/or reduce the chances of contamination from environmental factors. Disclosed examples also reduce the complexity required to extend the fluid fill location from inside the enclosure to the outside. For example, the top of the enclosure can be one continuous door for easier component access for servicing, because stationary parts and/or fluid sealing components are not needed to extend the fuel fill location to the exterior of the enclosure (e.g., through which a neck of the fluid container can protrude).

Disclosed examples enable spilled fluid to be evacuated without additional components. For example, the fuel tank and the side panel of the illustrated examples in FIGS. 1-5 would be present regardless of the presence of the evacuation system. Accordingly, the features of the fuel tank and the side panel provide an effective fuel evacuation system without further components.

Capture areas, channels, and fuel containers are disclosed having example shapes. However, the capture areas, the channels, and/or the fuel containers may have any other appropriate shape based on, for example, a size and/or shape of the enclosure, other components within the enclosure, and/or a capacity of the fuel containers.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed.

What is claimed is:

1. A system, comprising:
   an enclosure; and
   a fluid container within the enclosure, the fluid container comprising:
      a fluid capture area at a top of the fluid container; and
      a channel at a side of the fluid container, the fluid capture area to direct the fluid to the channel, the channel to direct the fluid from an interior of the enclosure to an exterior of the enclosure, wherein the enclosure comprises a flange to direct the fluid from the channel to the exterior of the enclosure and the channel laps the flange.

2. The system as defined in claim 1, wherein the fluid container is molded to include at least one of the fluid capture area or the channel.

3. The system as defined in claim 1, wherein the fluid container comprises a fluid inlet at the top of the fluid container, the fluid capture area being adjacent and below the fluid inlet.

4. The system as defined in claim 3, wherein the fluid capture area surrounds the fluid inlet to capture the fluid in any direction with respect to the fluid inlet.

5. A system, comprising:
   an enclosure; and
   a fluid container within the enclosure, the fluid container comprising:
   a fluid capture area at a top of the fluid container; and
   a channel at a side of the fluid container, the fluid capture area to direct the fluid to the channel, the channel to direct the fluid from an interior of the enclosure to an exterior of the enclosure, wherein the enclosure comprises a door or removable panel to provide access to the fluid inlet.

6. The system as defined in claim 5, wherein the fluid inlet of the fluid container is not accessible from an exterior of the enclosure when the door or the removable panel are in a closed position.

7. The system as defined in claim 1, wherein the fluid capture area is pitched toward the channel to direct the fluid to the channel.

8. The system as defined in claim 1, wherein the enclosure comprises a side panel, the fluid container being mounted in the enclosure adjacent the side panel, the flange being integral with the side panel.

9. A power system, comprising:
   an enclosure;
   an engine installed within the enclosure; and
   a fuel tank installed within the enclosure to store fuel for the engine, the fuel tank comprising:
      a fuel capture area at a top of the fuel tank; and
      a channel at a side of the fuel tank, the fuel capture area to direct the spilled fuel to the channel, the channel to direct the spilled fuel from an interior of the enclosure to an exterior of the enclosure, wherein the enclosure comprises a flange to direct the spilled fuel from the channel to the exterior of the enclosure and the channel laps the flange.

10. The power system as defined in claim 9, wherein the fuel tank is molded to include at least one of the fuel capture area or the channel.

11. The power system as defined in claim 9, wherein the fuel tank comprises a fuel inlet at the top of the fuel tank, the fuel capture area being adjacent and below the fuel inlet.

12. The power system as defined in claim 11, wherein the fuel capture area surrounds the fuel inlet to capture the spilled fuel in any direction with respect to the fuel inlet.

13. A power system, comprising:
   an enclosure;
   an engine installed within the enclosure; and
   a fuel tank installed within the enclosure to store fuel for the engine, the fuel tank comprising:
      a fuel inlet;
      a fuel capture area at a top of the fuel tank; and
      a channel at a side of the fuel tank, the fuel capture area to direct the spilled fuel to the channel, the channel to direct the spilled fuel from an interior of the enclosure to an exterior of the enclosure, wherein the enclosure comprises a door or removable panel to provide access to the fuel inlet.

14. The power system as defined in claim 13, wherein a fuel inlet of the fuel tank is not accessible from an exterior of the enclosure when the door or the removable panel are in a closed position.

15. The power system as defined in claim 9, wherein the fuel capture area is pitched toward the channel to direct the fuel to the channel.

16. The power system as defined in claim 9, wherein the enclosure comprises a side panel, the fuel tank being mounted in the enclosure adjacent the side panel, the flange being integral with the side panel.

17. A system, comprising:
   an enclosure comprising a top panel, a bottom panel, and a side panel; and
   a fluid container within the enclosure, the fluid container comprising:
      a fluid capture area at a top of the fluid container; and
      a channel at a side of the fluid container, the fluid capture area to direct the fluid to the channel, the channel to direct the fluid from an interior of the enclosure to an exterior side of the side panel of the enclosure.

18. The system as defined in claim 17, wherein the side panel of the enclosure is substantially vertical.

19. A power system, comprising:
   an enclosure comprising a top panel, a bottom panel, and a side panel;
   an engine installed within the enclosure; and
   a fuel tank installed within the enclosure to store fuel for the engine, the fuel tank comprising:
      a fuel capture area at a top of the fuel tank to capture spilled fuel; and
      a channel at a side of the fuel tank, the fuel capture area to direct the spilled fuel to the channel, the channel to direct the spilled fuel from an interior of the enclosure to an exterior side of the side panel of the enclosure.

20. The power system as defined in claim 19, wherein the side panel of the enclosure is substantially vertical.

\* \* \* \* \*